United States Patent
Francis et al.

(10) Patent No.: US 10,955,009 B2
(45) Date of Patent: Mar. 23, 2021

(54) CLUTCH PACK HAVING DIFFERENT CLUTCH PLATE MATERIALS

(71) Applicant: BorgWarner Inc., Auburn Hills, MI (US)

(72) Inventors: Philip John Francis, Lapeer, MI (US); Thomas Patrick Knox, Waterford, MI (US); Christopher Sullivan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 73 days.

(21) Appl. No.: 15/943,756

(22) Filed: Apr. 3, 2018

(65) Prior Publication Data
US 2019/0301538 A1    Oct. 3, 2019

(51) Int. Cl.
| | |
|---|---|
| *F16D 13/52* | (2006.01) |
| *F16D 13/64* | (2006.01) |
| *F16D 69/02* | (2006.01) |
| *F16D 69/00* | (2006.01) |

(52) U.S. Cl.
CPC ........... *F16D 13/52* (2013.01); *F16D 13/648* (2013.01); *F16D 69/02* (2013.01); *F16D 2069/002* (2013.01); *F16D 2069/003* (2013.01); *F16D 2200/0026* (2013.01); *F16D 2200/0052* (2013.01); *F16D 2300/10* (2013.01)

(58) Field of Classification Search
CPC .. F16D 25/0638; F16D 13/52; F16D 2129/02; F16D 2127/06; F16H 25/20; F16H 19/04; F15B 15/065
See application file for complete search history.

(56) References Cited

U.S. PATENT DOCUMENTS

| | | | |
|---|---|---|---|
| 1,982,769 | A | 12/1934 | Thompson |
| 2,381,941 | A | 8/1945 | Wellman et al. |
| 2,521,427 | A | 9/1950 | Victor |
| 2,525,428 | A | 10/1950 | Schoepe |
| 2,721,516 | A | 10/1955 | Campbell et al. |
| 2,733,797 | A | 2/1956 | Almen et al. |

(Continued)

FOREIGN PATENT DOCUMENTS

| | | |
|---|---|---|
| CN | 1215455 A | 4/1999 |
| CN | 102027256 A | 4/2011 |

(Continued)

OTHER PUBLICATIONS http://www.phoenixfriction.com /t-clutch-materials-explained. aspx;Clutch Friction Materials Explained—Organic,Kevlar, Ceramic, ECT.; 6pages.

*Primary Examiner* — David J Hlavka
(74) *Attorney, Agent, or Firm* — Young Basile Hanlon & MacFarlane, P.C.

(57) ABSTRACT

A number of variations may include a product including a single clutch pack having a plurality of clutch plates, and a first friction material on a first plate of the plurality of clutch plates, and a second friction material on a second plate of the plurality of plates, the first friction material being different than the second friction material, and constructed and arranged to provide a tailored combination of torque capacity and response time that would be produced by a clutch pack having solely the first friction material on plates thereof or the second friction material on plates thereof.

9 Claims, 2 Drawing Sheets

(56) References Cited

U.S. PATENT DOCUMENTS

| | | |
|---|---|---|
| 2,733,798 A | 2/1956 | Almen et al. |
| 2,849,346 A | 8/1958 | Almen et al. |
| 3,052,316 A | 9/1962 | Froberger |
| 3,053,341 A | 9/1962 | Rounds |
| 3,064,776 A | 11/1962 | Curran |
| 3,215,360 A | 11/1965 | Chambers |
| 3,320,107 A | 5/1967 | Christenson et al. |
| 3,390,750 A | 7/1968 | Albertson |
| 3,396,109 A | 8/1968 | Butler et al. |
| 3,491,865 A | 1/1970 | Stockton |
| 3,504,774 A | 4/1970 | Rode |
| 3,742,783 A | 7/1973 | Shealy |
| 3,797,621 A | 3/1974 | James |
| 3,913,377 A | 10/1975 | Lindeman |
| 4,042,085 A | 8/1977 | Bjerk et al. |
| 4,045,402 A | 8/1977 | Bjerk et al. |
| 4,664,826 A | 5/1987 | Gutierrez et al. |
| 4,702,850 A | 10/1987 | Gutierrez et al. |
| 4,776,969 A | 10/1988 | Ryer et al. |
| 4,898,038 A | 2/1990 | Kitamura |
| 4,951,793 A | 8/1990 | Hays |
| 5,033,599 A | 7/1991 | Hays |
| 5,078,893 A | 1/1992 | Ryer et al. |
| 5,135,669 A | 8/1992 | Brois et al. |
| 5,185,090 A | 2/1993 | Ryer et al. |
| 5,242,612 A | 9/1993 | Ryer et al. |
| 5,314,633 A | 5/1994 | Ryer et al. |
| 5,320,768 A | 6/1994 | Gutierrez et al. |
| 5,326,487 A | 7/1994 | Ryer et al. |
| 5,395,539 A | 3/1995 | Chandler et al. |
| 5,435,797 A | 7/1995 | Harris |
| 5,484,543 A | 1/1996 | Chandler et al. |
| 5,516,587 A * | 5/1996 | Tanaka ............... F16D 13/64 188/251 A |
| 5,526,914 A | 6/1996 | Dwivedi et al. |
| 5,534,170 A | 7/1996 | Watts |
| 5,750,476 A | 5/1998 | Nibert et al. |
| 5,823,845 A | 10/1998 | O'Berrigan |
| 5,840,663 A | 11/1998 | Nibert et al. |
| 5,937,979 A | 8/1999 | Cummings |
| 5,942,472 A | 8/1999 | Watts et al. |
| 5,947,247 A | 9/1999 | Cummings, III |
| 5,959,786 A | 9/1999 | Yamamoto et al. |
| 5,961,424 A | 10/1999 | Warner et al. |
| 5,967,276 A | 10/1999 | Leichliter et al. |
| 5,975,270 A | 11/1999 | Tokune et al. |
| 6,025,964 A | 2/2000 | Yamamoto |
| 6,074,993 A | 6/2000 | Waddoups et al. |
| 6,102,178 A | 8/2000 | Walton |
| 6,127,323 A | 10/2000 | Watts et al. |
| 6,237,735 B1 | 5/2001 | Walton et al. |
| 6,311,815 B1 | 11/2001 | Riggle et al. |
| 6,412,618 B1 | 7/2002 | Stretch et al. |
| 6,460,674 B1 | 10/2002 | Clay |
| 6,524,681 B1 | 2/2003 | Seitz et al. |
| 6,534,565 B1 | 3/2003 | Gardner et al. |
| 6,554,732 B1 | 4/2003 | Sommer |
| 6,557,679 B1 | 5/2003 | Warner et al. |
| 6,601,684 B2 | 8/2003 | Collis et al. |
| 6,641,507 B1 | 11/2003 | Warner et al. |
| 6,660,695 B2 | 12/2003 | Watts et al. |
| 6,668,891 B2 | 12/2003 | Collis |
| 6,843,353 B2 | 1/2005 | Majewski |
| 6,846,267 B1 | 1/2005 | Goatley |
| 7,007,782 B2 | 3/2006 | Anwar et al. |
| 7,104,378 B2 | 9/2006 | Martin |
| 7,175,570 B2 | 2/2007 | Lull et al. |
| 7,413,530 B2 | 8/2008 | Warner et al. |
| 7,458,911 B2 | 12/2008 | Krisher et al. |
| 7,488,275 B2 | 2/2009 | Warner et al. |
| 7,569,001 B2 | 8/2009 | Warner et al. |
| 7,591,765 B2 | 9/2009 | Warner et al. |
| 7,744,792 B2 | 6/2010 | Roberts |
| 7,766,790 B2 | 8/2010 | Stevenson et al. |
| 7,850,577 B2 | 12/2010 | Warner et al. |
| 8,101,286 B2 | 1/2012 | Tung et al. |
| 8,615,349 B2 | 12/2013 | Neelakantan et al. |
| 8,646,924 B2 | 2/2014 | Roth et al. |
| 8,794,416 B2 | 8/2014 | Weeter et al. |
| 8,813,937 B2 | 8/2014 | Hemphill |
| 9,657,798 B2 | 5/2017 | Lam et al. |
| 9,677,635 B2 | 6/2017 | Bares et al. |
| 2002/0134638 A1 | 9/2002 | Clay |
| 2002/0155929 A1 | 10/2002 | Lull et al. |
| 2002/0160887 A1 | 10/2002 | Warner et al. |
| 2003/0041524 A1 | 3/2003 | Gardner et al. |
| 2003/0047285 A1 | 3/2003 | Collis |
| 2003/0047411 A1 | 3/2003 | Collis et al. |
| 2003/0181339 A1 | 9/2003 | Watts et al. |
| 2003/0211918 A1 | 11/2003 | Warner et al. |
| 2003/0224911 A1 | 12/2003 | Warner et al. |
| 2004/0055848 A1 | 3/2004 | Majewski |
| 2004/0099371 A1 | 5/2004 | Hardies et al. |
| 2004/0159520 A1 | 8/2004 | Anwar et al. |
| 2004/0191525 A1 | 9/2004 | Roberts |
| 2005/0026732 A1 | 2/2005 | Krisher et al. |
| 2005/0221962 A1 | 10/2005 | Warner et al. |
| 2006/0065507 A1 | 3/2006 | Martin |
| 2006/0169564 A1 | 8/2006 | Krisher et al. |
| 2006/0204777 A1 | 9/2006 | Landa et al. |
| 2006/0213738 A1 | 9/2006 | Moser et al. |
| 2007/0000745 A1 | 1/2007 | Cameron et al. |
| 2007/0004564 A9 | 1/2007 | Warner et al. |
| 2007/0004603 A1 | 1/2007 | Iyer et al. |
| 2007/0042916 A1 | 2/2007 | Iyer et al. |
| 2007/0062777 A1 * | 3/2007 | Zagrodzki ............... F16D 65/12 192/70.2 |
| 2007/0065668 A1 * | 3/2007 | Idei .................... C08G 59/4253 428/411.1 |
| 2007/0132130 A1 | 6/2007 | Roberts |
| 2007/0137408 A1 | 6/2007 | Lassiter |
| 2007/0221468 A1 | 9/2007 | George et al. |
| 2007/0266817 A1 | 11/2007 | Lassiter |
| 2007/0295574 A1 * | 12/2007 | Toya .................... F16D 13/648 192/70.14 |
| 2008/0223681 A1 | 9/2008 | Stevenson et al. |
| 2009/0291811 A1 | 11/2009 | Warner et al. |
| 2009/0321210 A1 | 12/2009 | Tung et al. |
| 2010/0212442 A1 | 8/2010 | Aschauer |
| 2011/0100779 A1 | 5/2011 | Wheals |
| 2011/0112737 A1 | 5/2011 | Neelakantan et al. |
| 2011/0272238 A1 | 11/2011 | Basu et al. |
| 2012/0218656 A1 | 8/2012 | Roth et al. |
| 2013/0256938 A1 * | 10/2013 | Kobayashi ............ F16D 69/025 264/109 |
| 2013/0306429 A1 | 11/2013 | Weeter et al. |
| 2014/0228168 A1 | 8/2014 | Kaufman et al. |
| 2016/0281810 A1 * | 9/2016 | Terauchi ................. B32B 3/30 |

FOREIGN PATENT DOCUMENTS

| | | |
|---|---|---|
| DE | 68915155 T2 | 8/1994 |
| DE | 69115715 T2 | 6/1996 |
| DE | 6980133 T2 | 5/2002 |
| DE | 69621652 T2 | 2/2003 |
| DE | 69806382 T2 | 4/2003 |
| EP | 0240327 A2 | 10/1987 |
| EP | 0348236 A2 | 12/1989 |
| EP | 351964 A1 | 1/1990 |
| EP | 0353854 A1 | 2/1990 |
| EP | 0386923 A1 | 9/1990 |
| EP | 0556064 A2 | 8/1993 |
| EP | 611818 B1 | 8/1994 |
| EP | 0852155 A2 | 7/1998 |
| EP | 0867742 A2 | 9/1998 |
| EP | 0878724 A2 | 11/1998 |
| EP | 0892191 A1 | 1/1999 |
| EP | 0985572 A1 | 3/2000 |
| EP | 1008779 A1 | 6/2000 |
| EP | 1167799 A2 | 1/2002 |
| EP | 1344814 B1 | 9/2003 |
| EP | 1422435 A1 | 5/2004 |
| EP | 1502800 A1 | 2/2005 |

(56) References Cited

FOREIGN PATENT DOCUMENTS

| | | | |
|---|---|---|---|
| EP | 1643149 | A1 | 4/2006 |
| EP | 1739158 | A2 | 1/2007 |
| EP | 1739159 | A2 | 1/2007 |
| EP | 1739321 | A2 | 1/2007 |
| GB | 629203 | A | 9/1949 |
| GB | 980325 | A1 | 1/1965 |
| GB | 1189795 | A | 4/1970 |
| GB | 1201772 | A | 8/1970 |
| GB | 1554268 | A | 10/1979 |
| GB | 2294300 | A | 4/1996 |
| GB | 2322085 | A | 8/1998 |
| GB | 2333241 | A | 7/1999 |
| GB | 2428031 | A | 1/2007 |
| GB | 2458287 | A | 9/2009 |
| GB | 2508688 | A | 6/2014 |
| GB | 2508689 | A | 6/2014 |
| JP | 4153559 | B2 | 9/2008 |
| JP | 4317267 | B2 | 8/2009 |
| JP | 4379665 | B2 | 12/2009 |
| WO | 8912666 | A1 | 12/1989 |
| WO | 9004625 | A2 | 5/1990 |
| WO | 9008907 | A1 | 8/1990 |
| WO | 1992002603 | A1 | 2/1992 |
| WO | 9410269 | A1 | 5/1994 |
| WO | 9527859 | A1 | 10/1995 |
| WO | 9618049 | A1 | 6/1996 |
| WO | 9636683 | A1 | 11/1996 |
| WO | 9714773 | A1 | 4/1997 |
| WO | 9738236 | A1 | 10/1997 |
| WO | 9827187 | A1 | 6/1998 |
| WO | 9847989 | A1 | 10/1998 |
| WO | 9848191 | A1 | 10/1998 |
| WO | 1998048190 | A1 | 10/1998 |
| WO | 9856880 | A1 | 12/1998 |
| WO | 20000006927 | A1 | 2/2000 |
| WO | 0130948 | A1 | 5/2001 |
| WO | 0159315 | A1 | 8/2001 |
| WO | 0250445 | A1 | 6/2002 |
| WO | 02072210 | A1 | 9/2002 |
| WO | 03076022 | A1 | 9/2003 |
| WO | 03076258 | A2 | 9/2003 |
| WO | 2005012757 | A1 | 2/2005 |
| WO | 2005017382 | A2 | 2/2005 |
| WO | 2005033463 | A1 | 4/2005 |
| WO | 2007033378 | A1 | 3/2007 |
| WO | 2007033382 | A2 | 3/2007 |
| WO | 2008094698 | A1 | 8/2008 |
| WO | 2009112788 | A1 | 9/2009 |
| WO | 2012118749 | A1 | 9/2012 |
| WO | 2014037541 | A1 | 3/2014 |
| WO | 2014037542 | A1 | 3/2014 |
| WO | 2014060002 | A1 | 4/2014 |
| WO | 2014123788 | A2 | 8/2014 |

\* cited by examiner

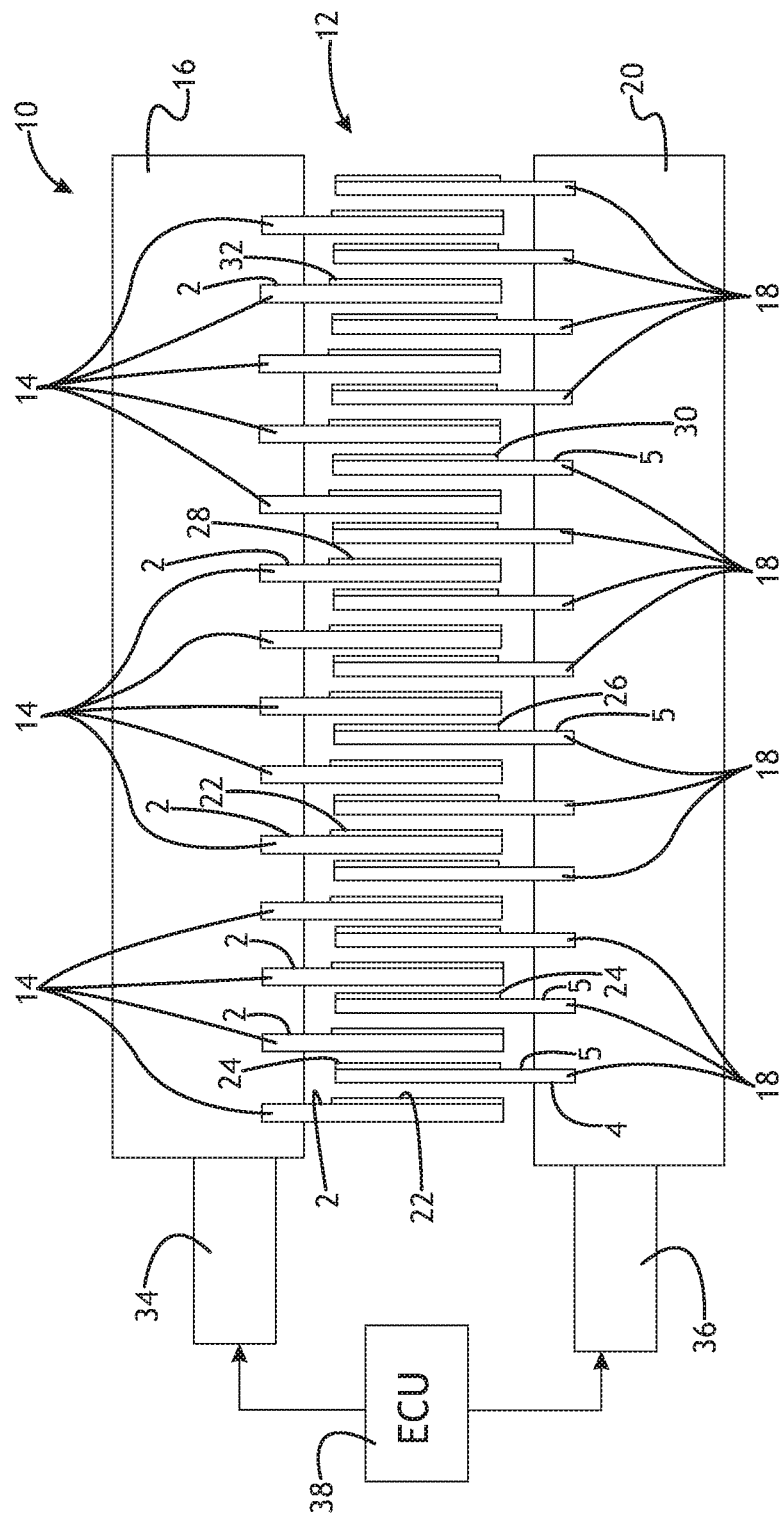

CLUTCH PACK HAVING DIFFERENT CLUTCH PLATE MATERIALS

TECHNICAL FIELD

The field to which the disclosure generally relates to includes vehicle clutch packs.

BACKGROUND

Materials used for clutch plates may have different torque characteristics which may vary with temperature and load demands.

SUMMARY OF ILLUSTRATIVE VARIATIONS

A number of variations may include a product including a single clutch pack having a plurality of clutch plates, and a first friction material on a first plate of the plurality of clutch plates, and a second friction material on a second plate of the plurality of clutch plates, the first friction material being different than the second friction material, and constructed and arranged to provide a tailored combination of torque capacity and response time that would be produced by a clutch pack having solely the first friction material on plates thereof or the second friction material on plates thereof.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 illustrates a schematic illustration of a clutch pack including a first clutch plate having a first friction material thereon and a second clutch plate having a second friction material thereon, wherein the first friction material and the second friction material are different according to a number of variations.

DETAILED DESCRIPTION OF ILLUSTRATIVE VARIATIONS

Figure 1:
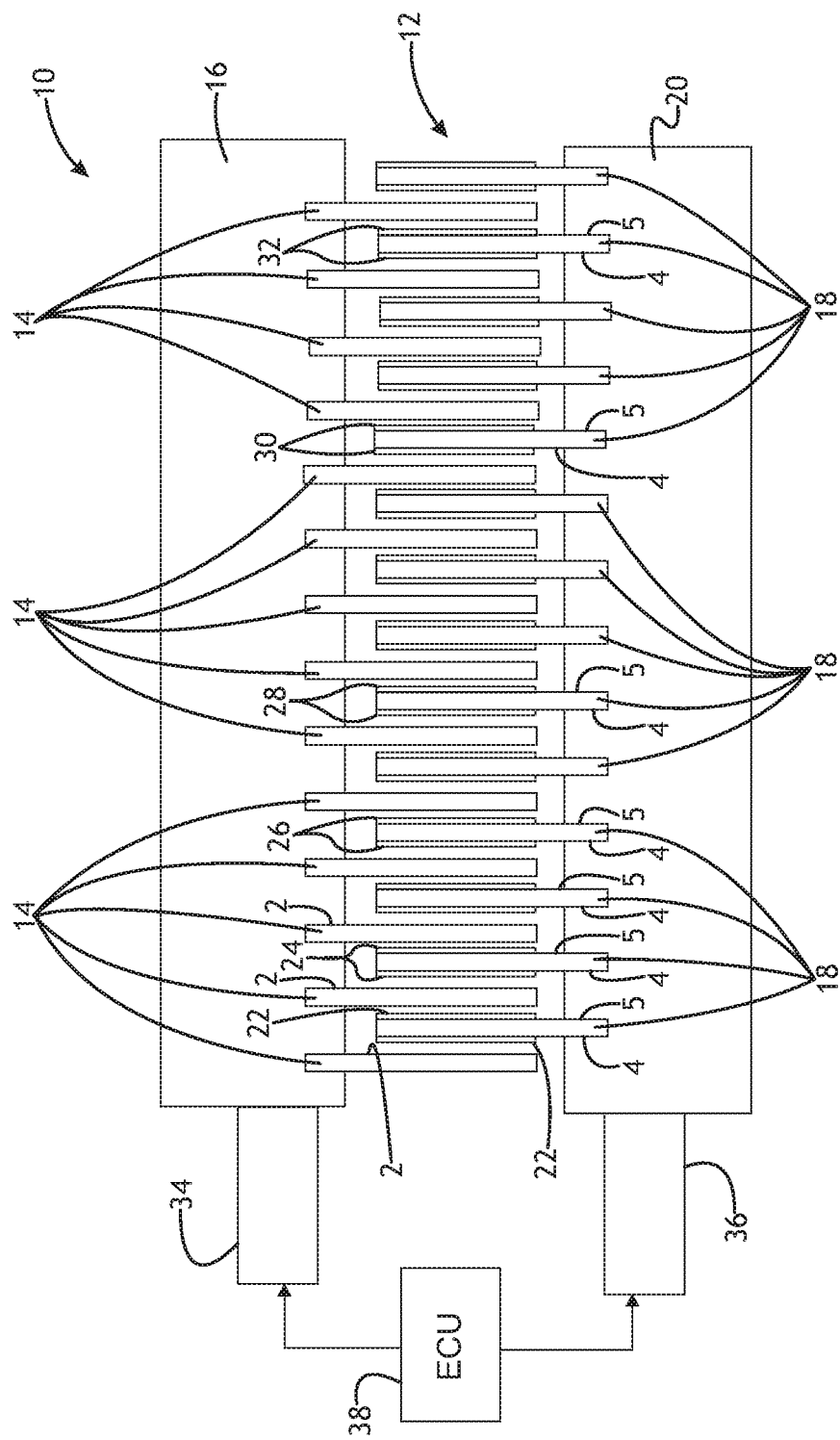
FIG. 1 illustrates a schematic illustration of a clutch pack including a first clutch plate having a first friction material thereon and a second clutch plate having a second friction material thereon, wherein the first friction material and the second friction material are different according to a number of variations.

The following description of the variations is merely illustrative in nature and is in no way intended to limit the scope of the invention, its application, or uses.

It has been discovered that sintered clutch plates compress very little under load, which can improve response time. Sintered clutch plates typically have lower p values, so more plates are required in a clutch pack. Other clutch plates may use paper-resin material, which have a higher p value but have been discovered to require more compression, which increases the response time of the system.

FIGS. 1 and 2 illustrate a number of variations which may include a product 10 having a clutch pack 12. A plurality of outer annular clutch plates or separator plates 14 may be disposed in a spline member 16 for slideable movement in a housing in a manner known to those skilled in the art. A plurality of inner annular clutch plates or friction plates 18 may be disposed in a spline member 20 for slideable movement in a housing in a manner known to those skilled in the art. Each of the plurality of outer annual clutch plates 14 and the plurality of inner annular clutch plates 18 may have an inner surface 2, 4, 5 on which at least one of a first friction material 22, a second friction material 24, a third friction material 26, fourth friction material 28, fifth friction material 30 or sixth friction material 32 may be provided. In a number of variations, at least two of the first friction material 22, second friction material 24, third friction material 26, fourth friction material 28, fifth friction material 30 or sixth friction material 32 are included in the clutch pack 12 to produce a mixed result, in order to obtain a tailored combination of torque capacity and response time.

Referring to FIG. 1, in a number of variations, a first friction material 22 may be sintered bronze or carbon on a first surface 4 and a second surface 5 of at least one of the plurality of inner annular clutch plates 18. A second friction material 24 may be a paper-resin material on a first inner surface 4 and a second inner surface 5 of at least one other of the plurality of inner annular clutch plates 18. At least one third friction material 26, fourth friction material 28, fifth friction material 30, and/or sixth friction material 32 may also be used on the first and second inner surfaces 4, 5 of at least one other inner annular clutch plate 18, respectively.

Referring to FIG. 2, in a number of variations, an inner surface 2, facing a first direction, of at least one of the plurality of outer annular clutch plates 14 may include a first friction material 22 including, but not limited to, sintered bronze or carbon. In a number of variations, an inner surface 5, also facing the first direction, of at least one of the plurality of inner annular clutch plates 18 may include a second friction material 24 including, but not limited to, a paper-resin material. In a number of variations, at least one third friction material 26, fourth friction material 28, fifth friction material 30, and/or sixth friction material 32 may also be used on an inner surface 2, 5 of another of the plurality of inner annular clutch plates 18 and/or the outer annular clutch plates 14, respectively.

It is noted that FIGS. 1 and 2 are presented for illustrative purposes only and any number of variations of arrangements of friction materials may be used on the plurality of inner annular clutch plates 18 and/or the outer annular clutch plates including, but not limited to, use of only two different friction materials or the use of more than two friction materials, grouping of the sintered bronze friction or carbon material plates, the paper-resin friction material plates 24, or other friction material plates separately, alternating the sintered bronze or carbon plates, the paper-resin friction material plates, and/or other friction material plates in the clutch pack or a mixture of groupings and alternating clutch plate pairs may be utilized. Sintered bronze plates may have a typical µ value of 0.11, which may drop to 0.07µ when the clutch pack is hot. This may decrease the torque from an acceptable level, to one that may not meet the demands of the vehicle. Whereas the paper-resins plates can offer a higher µ value and are less sensitive to temperature variations, thereby meeting the torque demands. However, paper-resin plates can require more compression for higher torque levels, which may increase response time in the system.

In a number of variations, the paper-resin plates may include a friction facing layer including a compliant carrier sheet such as friction paper composed of cellulose fibers saturated with liquid phenolic resin coated by compression molding of a granular mixture of carbon and phenolic thermoset binder.

By combining these two types of friction materials in a clutch pack, generally higher torque values can be maintained throughout the temperature range of operation of the system, and the response time will not be harmed. Plates with two different friction materials can be interspersed in the clutch pack, or grouped with like kind, and both methods should offer the same benefit. Overall, a higher nominal μ value is obtained, and an average smaller compression of the clutch pack is achieved, with the benefits of generally a higher torque.

Other suitable materials for the third, fourth, fifth, or sixth friction material to be provided on an inside surface 2, 4, 5 of one of the annular clutch plates 14, 18 may include organic friction materials which may be made from phenolic resins, friction modifiers including metallic powders, metallic oxides or compound rubber; ceramic friction materials which may be made from a mixture of copper, iron, tin bronze, silicon dioxide, and/or graphite; or Kevlar or Twaron type friction materials which may include para-aramid fibers that may be bound together by a resin; Feramic friction materials which may include a combination of steel, silicon dioxide, tin bronze, and graphite; and Feramolloy friction materials.

In a number of variations, at least one of the clutch plates may include an organic friction material, which may be made from phenolic resins, friction modifiers including metallic powders, metallic oxides or compound rubber. These facings may come in two types: molded facings; and fiber based facing, which may include woven or unwoven fibers. The fibers may be of any known to those skilled in the art including, but not limited to, glass fibers, aramid fibers, and/or ceramic fibers. A variety of resins known to those skilled in the art may be used including, but not limited to, phenolic, epoxy, and silicone resins. A variety of fillers may also be used.

The following chart illustrates nominal p values for clutch packs having either paper-lined plates or sintered plates when the clutch pack is at a cold or hot temperature.

| μ Nominal Values | | |
|---|---|---|
| Paper Lined | Sintered | |
| 0.15-0.16 | 0.10-0.11 | COLD |
| 0.12 | 0.07 | HOT |

The clutch pack having paper-lined plates may have a lower compression force as compared to a clutch pack having sintered plates, which may have a higher compression force. In a number of variations, the plates with different friction material may be selected and arranged to achieve a desired average coefficient of friction for the clutch pack and an average compression force in a clutch pack. For example, the plates with different friction material may be selected and arranged to achieve an overall coefficient of friction nominally higher for the clutch pack, and an average compression force in the clutch pack that is nominally lower. A number of variations may include a clutch pack comprising: a plurality of friction plates interleaved between a plurality of separator plates, wherein the plurality of friction plates comprises a plurality of sintered bronze or carbon plates and a plurality of paper-resin plates; and wherein the clutch pack is constructed and arranged to provide a nominally higher coefficient of friction while also providing a compression force, averaged between that typically seen of a clutch pack having only sintered bronze clutch plates and a clutch pack having only paper-lined clutch plates, during frictional contact of the plurality of friction plates with the plurality of separator plates.

In a number of variations, the plurality of sintered bronze or carbon plates may be interspersed with the plurality of paper-resin plates in the clutch pack.

In a number of variations, the plurality of sintered bronze or carbon plates are grouped together, and the plurality of paper-resin plates are grouped together in the clutch pack.

A number of variations may include a product including a single clutch pack having a plurality of clutch plates, and a first friction material on a first plate of the plurality of clutch plates, and a second friction material on a second plate of the plurality of clutch plates, the first friction material being different than the second friction material, and constructed and arranged to provide a tailored combination of torque capacity and response time that would be produced by a clutch pack having solely the first friction material on plates thereof or the second friction material on plates thereof.

A number of variations may include a clutch pack comprising: a plurality of clutch plates, the plurality of clutch plates having a first friction material and a second friction material different than the first friction material selected and arranged to achieve a desired average coefficient of friction and a nominal maximum compression force in the clutch pack so that the clutch pack has an overall coefficient of friction between that of a first clutch pack including plates having only the first friction material and a second clutch pack including plates having only the second material to provide a nominally higher coefficient of friction at a nominally lower plate pressure in achieving a maximum torque The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a clutch pack comprising: a first plurality of clutch plates comprising a first friction material and a second plurality of clutch plates comprising a second friction material different than the first friction material, wherein the first plurality of clutch plates and the second plurality of clutch plates are selected and arranged to achieve a desired average coefficient of friction and a nominal maximum compression force in the clutch pack so that the clutch pack has an overall coefficient of friction between that of a second clutch pack including plates having only the first friction material and a third clutch pack including plates having only the second material to provide a nominally higher coefficient of friction at a nominally lower plate pressure in achieving a maximum torque.

Variation 2 may include a clutch pack comprising: a plurality of friction plates interleaved between a plurality of separator plates, wherein at least one of the plurality of friction plates and at least one of the plurality of separator plates includes a sintered bronze or carbon friction material and at least one other of the plurality of friction plates and the plurality of separator plates includes a paper-resin friction material; and wherein the clutch pack is constructed and arranged to provide an average coefficient of friction and a nominal maximum compression force in the clutch pack so that the clutch pack has an overall coefficient of friction between that of a clutch pack including only sintered bronze or carbon clutch plates and a clutch pack including only paper-resin clutch plates to provide a nominally higher coefficient of friction at a nominally lower plate pressure in achieving a maximum torque, during frictional contact of the plurality of friction plates with the plurality of separator plates.

Variation 3 may include a clutch pack as set forth in Variation 2, wherein the plurality of sintered bronze or carbon plates may be interspersed with the plurality of paper-resin plates in the clutch pack.

Variation 4 may include a clutch pack as set forth in any of Variations 2-3, wherein the plurality of sintered bronze or carbon plates are grouped together and the plurality of paper-resin plates are grouped together in the clutch pack.

Variation 5 may include a clutch pack as set forth in any of Variations 2-4, wherein at least one of the plurality of friction plates or the plurality of separator plates includes at least one of an organic friction material, a ceramic friction material, a Kevlar or Twaron type friction material, or a Feramolloy friction material.

Variation 6 may include a clutch pack as set forth in any of Variations 2-5, wherein at least one of the plurality of separator plates comprises the sintered bronze or carbon friction material and at least one of the plurality of friction plates comprises the paper-lined friction material.

Variation 7 may include a clutch pack as set forth in any of Variations 2-5, wherein at least one of the plurality of friction plates comprises the sintered bronze or carbon friction material and at least one of the plurality of separator plates comprises the paper-lined friction material.

Variation 8 may include a product including a single clutch pack having a plurality of clutch plates, and a first friction material on a first plate of the plurality of clutch plates, and a second friction material on a second plate of the plurality of clutch plates, the first friction material being different than the second friction material, and constructed and arranged to provide a tailored combination of torque capacity and response time that would be produced by a clutch pack having solely the first friction material on plates thereof or the second friction material on plates thereof.

The above description of select variations within the scope of the invention is merely illustrative in nature and, thus, variations or variants thereof are not to be regarded as a departure from the spirit and scope of the invention.

What is claimed is:

1. A clutch pack comprising: a first plurality of clutch plates comprising a first friction material and a second plurality of clutch plates comprising a second friction material different than the first friction material, wherein the first plurality of clutch plates and the second plurality of clutch plates are selected and arranged to achieve a desired average coefficient of friction and a nominal maximum compression force in the clutch pack so that the clutch pack has an overall coefficient of friction to provide a nominally higher coefficient of friction at a nominally lower plate pressure in achieving a maximum torque, wherein the first friction material comprises sintered bronze on a first inner surface and an opposite second inner surface each of the first plurality of clutch plates, and the second friction material comprises a paper-resin material on a first inner surface and an opposite second inner surface each of the second plurality of clutch plates.

2. A clutch pack comprising: a plurality of friction plates interleaved between a plurality of separator plates, wherein at least one of the plurality of friction plates or the plurality of separator plates includes a sintered bronze friction material on each of a first inner surface and an opposite second inner surface of each one of the plurality of friction plates or on each one a first inner surface and an opposite second inner surface of the plurality of separator plates, and at least one other of the plurality of friction plates or the plurality of separator plates includes a paper-resin friction material on each of a first inner surface and an opposite second inner surface of each one of the plurality of friction plates or on each one of a first inner surface and an opposite second inner surface the plurality of separator plates; and wherein the clutch pack is constructed and arranged to provide an average coefficient of friction and a nominal maximum compression force in the clutch pack so that the clutch pack has an overall coefficient of friction to provide a nominally higher coefficient of friction at a nominally lower plate pressure in achieving a maximum torque, during frictional contact of the plurality of friction plates with the plurality of separator plates.

3. The clutch pack as set forth in claim 2, wherein a plurality of plates including sintered bronze is interspersed with the plurality of plates including a paper-resin friction material in the clutch pack.

4. The clutch pack as set forth in claim 2, wherein the plurality of plate including sintered bronze are grouped together and the plurality plates including a paper-resin friction material are grouped together in the clutch pack.

5. The clutch pack of claim 2, wherein at least one of the plurality of friction plates or the plurality of separator plates includes at least one of an organic friction material, a ceramic friction material, a Kevlar or Twaron type friction material, or a Feramolloy friction material.

6. The clutch pack as set forth in claim 2, wherein at least one of the plurality of separator plates comprises the sintered bronze friction material and at least one of the plurality of friction plates comprises a paper-lined friction material.

7. The clutch pack as set forth in claim 2, wherein at least one of the plurality of friction plates comprises the sintered bronze friction material and at least one of the plurality of separator plates comprises a paper-lined friction material.

8. A product comprising a single clutch pack having a plurality of clutch plates, and a first friction material on a first plate of the plurality of clutch plates, and a second friction material on a second plate of the plurality of clutch plates, the first friction material being different than the second friction material, and constructed and arranged to provide a tailored combination of torque capacity and response time that would be produced by having solely the first friction material on plates thereof or the second friction material on plates thereof, wherein the first friction material comprise a sintered friction material on each of a first inner surface and an opposite second inner surface of the first plate, and wherein the second friction material comprises fibers and resin on each of a first inner surface and an opposite second inner surface of the second plate.

9. A product as set forth in claim 8 wherein the sintered friction material comprises sintered bronze.

\* \* \* \* \*

UNITED STATES PATENT AND TRADEMARK OFFICE
CERTIFICATE OF CORRECTION

PATENT NO. : 10,955,009 B2
APPLICATION NO. : 15/943756
DATED : March 23, 2021
INVENTOR(S) : Philip John Francis, Thomas Patrick Knox and Christopher Sullivan Page 1 of 1

It is certified that error appears in the above-identified patent and that said Letters Patent is hereby corrected as shown below:

In the Specification

In Column 1, Line 61, please make the following change:
Sintered clutch plates typically have lower µ values, so more In Column 1, Line 63, please make the following change:
use paper-resin material, which have a higher µ value but In Column 3, Line 40, please make the following change:
The following chart illustrates nominal µ values for clutch Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*